United States Patent [19]

Werner et al.

[11] Patent Number: 4,830,465

[45] Date of Patent: May 16, 1989

[54] IRREVERSIBLE OPTICAL RECORDING MEDIA AND FABRICATION THEREOF

[75] Inventors: Arend Werner, Bad Duerkheim; Hartmut Hibst, Ludwigshafen; Helmut Barzynski, Bad Duerkheim, all of Fed. Rep. of Germany

[73] Assignee: BASF Aktiengesellschaft, Ludwigshafen, Fed. Rep. of Germany

[21] Appl. No.: 178,917

[22] Filed: Apr. 7, 1988

[30] Foreign Application Priority Data

Apr. 15, 1987 [DE] Fed. Rep. of Germany ....... 3712858

[51] Int. Cl.[4] .................. G02B 27/00; G01D 9/00
[52] U.S. Cl. .................... 350/321; 350/320; 350/164; 346/135.1; 427/250; 430/8
[58] Field of Search .............. 350/321, 322, 1.1, 1.6, 350/1.7, 164, 166, 320; 427/146, 147, 250; 365/121, 126; 346/1.1, 135.1, 76 L; 430/8, 19

[56] References Cited

U.S. PATENT DOCUMENTS

| | | | |
|---|---|---|---|
| 4,422,721 | 12/1983 | Hahn et al. | 350/164 |
| 4,425,570 | 1/1984 | Bell et al. | 346/135.1 |
| 4,430,401 | 2/1984 | Wilkinson | 346/135.1 |
| 4,614,951 | 9/1986 | Osato et al. | 346/135.1 |
| 4,636,409 | 1/1987 | Arai et al. | 346/135.1 |

FOREIGN PATENT DOCUMENTS

0107379  5/1984  European Pat. Off. .

OTHER PUBLICATIONS

P. Clapham & M. Hutley: Nature, vol. 244, pp. 281-282 (1973).
Appl. Phys. Lett., 40, pp. 622-624 (1982).
OZ 0050/38525 Application.

*Primary Examiner*—John K. Corbin
*Assistant Examiner*—Loha Ben
*Attorney, Agent, or Firm*—Keil & Weinkauf

[57] ABSTRACT

Irreversible optical recording media record information through local alteration of the optical properties of a recording layer on exposure to light.

4 Claims, No Drawings

IRREVERSIBLE OPTICAL RECORDING MEDIA AND FABRICATION THEREOF

The present invention relates to irreversible optical recording media for recording information through local alteration of the optical properties of a recording layer on exposure to light and a process for fabricating this recording medium. It is known that the optical properties, such as the reflectance, of surfaces differ greatly depending on whether the surface is planar or whether it has a microstructure, or texture, whose dimensions are of the order of the wavelength of the light. For instance, the reflectivity of surfaces having such a microstructure is appreciably less than that of planar surfaces (P. Clapham and M. Hutley; Nature 244 (1973), 281). If metal or semiconductor surfaces having a high absorption coefficient are used, the reduction in the normally high reflectivity of the materials due to the creation of a textured surface causes a high absorption of the incident light energy in a thin surface zone. The resulting high temperature in this zone, for example from irradiation with a powerful laser beam, can be utilized to effect an alteration in the surface structure which in turn causes an alteration in the optical properties. This effect can be exploited for irreversible optical storage in that the action of a powerful laser beam causes a local irreversible alteration, for example in the reflectivity of a metal or semiconductor layer.

Appl. Phys. Lett. 40 (1982), 622, describes an optically irreversible storage medium comprising a Ge layer textured by means of ion etching techniques (Ge columns about 200 nm in diameter). This texture is planarized by irradiation with a laser. The disadvantage is the very complicated and costly process required to produce such ion etched surfaces. According to EP-A-0,107,379, the recording layer comprises a metal film which is applied to the textured surface of a plastics substrate. The textured substrate is copied from a stamper by injection molding. The original used for the mastering process is a laser interferogram which is used to expose a photoresist layer which, following subsequent development and chemical milling, gives the desired textured surface. The original produced by laser interference can, for example, have a pattern of grooves in a wide variety of arrangements or, in a nonstandard form, protuberances caused by the crossing of grooves. As a consequence of the fabricating process, the arrangements of the grooves or protuberances are rigidly periodic. One disadvantage is therefore that the interferogram permits only limited variation in texturing and, furthermore, is complicated to produce. In addition, this periodic arrangement leads in a disadvantageous manner to appreciable differences in the reflection as a function of the polarization of the light used. Furthermore, the reflection is dependent to an undesirably high degree on the angle of incidence of the light. The dimensions given for the grooves and protuberances in said publication are of the order of spacings of about 200 nm and depths from at least 100 nm to 400 nm.

German Laid-Open Application DE-OS 3,621,685 describes an irreversible optical recording medium which has a textured recording layer composed of one or more plies of polymer beads and, applied to this textured plastics layer, a metal or semiconductor layer acting as an absorber. Using polymer bead diameters of about 50 nm it is possible to produce very fine textures which, and this represents a further advantage of this medium, can be made nonperiodic by arbitrary arrangement of the polymer beads. It has been possible to show that this recording layer has excellent optical properties, such as low reflectivity in the unwritten case and high reflectivity after writing with a laser. On the other hand, it is a disadvantage that it is necessary to apply a polymer bead layer for very individual storage medium. Consequently, this process is uneconomical.

It is an object of the present invention to provide an irreversible optical recording medium and an economical process for fabricating same, which, on the one hand, utilizes the advantages of inexpensive duplication of the textured surface by injection molding and which, on the other hand, bypasses the disadvantageous properties of an original produced by laser interferometry.

We have found that this object is achieved with an irreversible optical recording medium consisting essentially of a substrate having a textured surface and a metal or semiconductor layer applied thereto having an optical absorption from 5 to 95% and a thickness from 10 to 50 nm if the textured surface comprises randomly arranged hemispherical structures of elevations or depressions from more than 200 nm to 500 nm in diameter which undergo alteration on exposure to light. This light-induced alteration of the existing structure also entails an alteration in the optical properties of the recording medium.

In a convenient embodiment of the recording medium according to the invention, the hemispherical structures comprise elevations or depressions having a uniform diameter of from more than 200 nm to 500 nm. In addition, good utility is also possessed by structures comprising a mixture of hemispherical elevations or depressions having different diameters within the range from more than 200 nm to 500 nm.

The recording medium according to the invention consists of a substrate which transmits the light used, in general laser light from 0.3 to 1.0 $\mu$m in wavelength, and which is made of a plastics material, eg. polycarbonate, PMMA or polystyrene having a textured surface and, applied thereto, a metal or semiconductor layer, made for example of gold, platinum, silver, germanium, silicon or an alloy thereof, where the texture comprises structures of the stated dimensions.

The present invention also provides a process for fabricating an optical recording medium of the type defined by producing the textured substrate by pressing or injection molding using a stamper and subsequently coating the textured surface of the substrate in a thickness from 10 to 50 nm with a metal or semiconductor layer having an optical absorption of from 5 to 95%, which comprises producing the stamper by applying a dispersion of polymer beads from more than 200 nm to 500 nm in diameter in a solvent to a planar auxiliary substrate, applying an electroconductive layer thereto by vapor deposition and then increasing the thickness of this layer to such an extent that the original and the metal replicate serving as stamper can be separated from each other.

In detail, the process according to the invention is carried out by first applying a dispersion of polymer beads, preferably by spincoating, in an extremely thin layer, preferably a monolayer of these polymer beads, to a planar auxiliary substrate, in general glass. Not only the production of these polymer beads in the desired particle size but also their conversion into a dispersed form and the application of said dispersion to a base material are known and described inter alia in German Laid-Open Application DE-OS 3,621,685.

This layer is then coated by high vacuum vapor deposition or by cathode sputtering with a metal layer, in general silver, nickel or platinum, preferably silver, from 0.1 to 1.0 μm in thickness. This metal layer on top of the polymer beads is then thickened in a conventional manner, for example by chemical means, by electroplating or by combined chemical/electroplating means. This is customarily done with nickel. Thereafter the entire metal layer should advantageously be from 0.1 to 0.5 mm in thickness. The negative impression thus obtained is washed out with a solvent for the polymer beads, for example with toluene, and optionally passivated on the surface with an oxidizing agent to produce further metal copies (stampers). The metal plates thus produced then serve as embossing molds for producing the substrates having a textured surface. They are produced in a conventional manner by injection molding, injection stamping, pressing or casting. Suitable polymers for this purpose are polycarbonates, polyesters, polyvinyl chloride, polymethylstyrene, polymethacrylates and polymethyl methacrylates. In this way it is possible to reproduce not only positive but also negative impressions of the original used.

The resulting substrate having a textured surface is finally turned into the optical recording medium according to the invention by application in a thickness from 10 to 50 nm of the specific metal or semiconductor layer having an optical absorption of from 5 to 95%. This metal or semiconductor layer is produced in a conventional manner in a high vacuum coating process, for example by sputtering or by vapor deposition.

These optical, irreversible recording media according to the invention are advantageous over those of the prior art in having a texture without periodic arrangements. In addition, it is of particular advantage that they are simpler and less costly to fabricate.

Furthermore, the irreversible optical recording medium according to the invention makes it possible to use plastics which are admittedly not producible in the form of fine beads applicable by spincoating but which, owing to their chemical and physical properties, offer advantages in the known preparation of marks by laser irradiation over those polymers which are available in the form of beads.

To produce the groove tracks known for such recording media, or any other preshaped information in the recording layer, the polymer bead original, before it is coated with metal, can on a suitable laser writing station be provided with a groove track or be written with information in certain segments.

The application of a textured surface produced according to the invention is not restricted to optically irreversible recording layers of the type described above. The injection molded textured substrate can also be used to improve other, prior art irreversible or reversible optical recording media. Since these textured surfaces show no polarization effects, owing to the irregular arrangement of the hemispherical elevations or depressions, they can also be used for enhancing light absorption and hence for increasing the write sensitivity in the case of magneto-optical storage layers. Such textured surfaces can further find use as substrates for magnetic storage layers to guarantee the flight behavior of the magnetic heads.

EXAMPLE

A PMMA disk 18 cm in diameter was provided with a layer of polystyrene beads (bead diameter 250 nm) by spin-coating with a polystyrene emulsion. In a high vacuum vapor deposition unit, this textured layer was coated with a 100 nm thick layer of silver. In an electroplating bath containing aqueous nickel sulfamate as electrolyte, the silver layer was anodically coated with nickel at 55° C. in a layer thickness of 0.28 mm. To avoid deformations in the course of this nickelization, a slowly increasing current strength (0.1 ampere to 10 amperes) was used. The nickel plate stamper was then separated from the PMMA disk and treated with boiling toluene for 1 hour, and the silver was removed wtih an ammoniacal solution of hydrogen peroxide. Scanning electron micrographs of the stamper surface clearly show hemispherical depressions of 250 nm in diameter as reproductions of the polymer beads. The stamper was cut at the edge to a diameter of 13 cm and placed in a plastics press. A commercial epoxy resin was poured in and thermally cured. The nickel plate was exfoliable from the hand disk. The impression thus produced was then vapor deposited with a 20 nm thick layer of gold. Reflectance measurements through the substrate gave a reduction of 40% for a wavelength of 800 nm compared with a corresponding layer of gold on a planar epoxy substrate.

We claim:

1. An irreversible optical recording medium consisting essentially of a substrate having a textured surface and a metal or semiconductor layer applied thereto having an optical absorption from 5 to 95% and a thickness from 10 to 50 nm, wherein the textured surface comprises a randomly arranged hemispherical pattern of elevations and depressions from more than 200 nm to 500 nm in diameter which undergo alteration on exposure to light.

2. An irreversible optical recording medium as defined in claim 1, wherein the elevations and depressions have a uniform diameter of from more than 200 nm to 500 nm.

3. An irreversible optical recording medium as defined in claim 1, wherein the elevations and depressions have different diameters within the range from more than 200 nm to 500 nm.

4. A process for fabricating an irreversible optical recording medium by producing a substrate having a textured surface from a polymer of the group consisting of the polycarbonates, polyesters, polyvinyl chloride, polymethylstyrene, polymethacrylates and polymethyl methacrylates by pressing or by injection molding by means of a stamper which is produced by applying a dispersion of polymer beads of more than 200 nm up to 500 nm in diameter in a solvent to a planar auxiliary substrate, removing the solvent, coating the layer of polymer beads with an electroconductive layer by vapor deposition, thickening this layer by plating and subsequently separating the plated layer from the auxiliary substrate coated with polymer beads; and coating the textured surface of the substrate in a thickness of from 10 to 50 nm with a metal or semiconductor layer having an optical absorption of from 5 to 95%.

* * * * *